United States Patent
Gostelow et al.

(10) Patent No.: US 11,853,331 B2
(45) Date of Patent: *Dec. 26, 2023

(54) SPECIALIZED SEARCH SYSTEM AND METHOD FOR MATCHING A STUDENT TO A TUTOR

(71) Applicant: Wyzant, Inc., Chicago, IL (US)

(72) Inventors: Jonathan Gostelow, Chicago, IL (US); Mackenzie Siren, Chicago, IL (US); Matthew Winkler, Chicago, IL (US); Matthew Siehoff, Chicago, IL (US)

(73) Assignee: Wyzant, Inc., Chicago, IL (US)

( * ) Notice: Subject to any disclaimer, the term of this patent is extended or adjusted under 35 U.S.C. 154(b) by 71 days.

This patent is subject to a terminal disclaimer.

(21) Appl. No.: 17/320,529

(22) Filed: May 14, 2021

(65) Prior Publication Data

US 2021/0294821 A1 Sep. 23, 2021

Related U.S. Application Data

(63) Continuation of application No. 16/035,040, filed on Jul. 13, 2018, now Pat. No. 11,036,770.

(51) Int. Cl.
| | | |
|---|---|---|
| *G06F 16/30* | (2019.01) | |
| *G06F 16/28* | (2019.01) | |
| *G06Q 50/20* | (2012.01) | |
| *G06F 16/248* | (2019.01) | |
| *G06F 16/2457* | (2019.01) | |
| *G06F 40/226* | (2020.01) | |

(52) U.S. Cl.
CPC .......... *G06F 16/288* (2019.01); *G06F 16/248* (2019.01); *G06F 16/24578* (2019.01); *G06F 16/285* (2019.01); *G06F 40/226* (2020.01); *G06Q 50/205* (2013.01)

(58) Field of Classification Search
CPC ................. G06F 16/288; G06F 16/285; G06F 16/24578; G06F 16/248; G06F 40/226; G06F 50/205
See application file for complete search history.

(56) References Cited

U.S. PATENT DOCUMENTS

| | | |
|---|---|---|
| 5,873,056 A | 2/1999 | Liddy |
| 6,325,632 B1 | 12/2001 | Chao |
| 8,457,979 B2 * | 6/2013 | Kurtzig ............... G06Q 10/101 705/321 |
| 8,843,477 B1 | 9/2014 | Tirumalareddy |
| 2012/0053946 A1 | 3/2012 | Bellegarda |
| 2014/0280084 A1 | 9/2014 | Dulitz |

(Continued)

OTHER PUBLICATIONS

Mikolov, Distributed Representations of Words and Phrases and their Compositionality, 2013.

(Continued)

*Primary Examiner* — Tarek Chbouki
(74) *Attorney, Agent, or Firm* — BAKER & MCKENZIE

(57) ABSTRACT

A system and method for matching students to tutors is disclosed. In particular, a user submits a query and in response a plurality of tutors are identified responsive to the search query. The identified tutors are then ranked based on relevance to the search query. The identified tutors are then presented to the user in an order based on the relevance score assigned to each tutor.

12 Claims, 5 Drawing Sheets

(56) References Cited

U.S. PATENT DOCUMENTS

| | | | | |
|---|---|---|---|---|
| 2014/0342336 A1* | 11/2014 | Kapoor | ................... | G09B 5/06 434/308 |
| 2015/0332405 A1* | 11/2015 | Kachnowski | ......... | G06F 16/334 705/36 R |
| 2016/0042654 A1* | 2/2016 | Fieldman | ................. | G09B 5/06 434/362 |
| 2016/0140123 A1 | 5/2016 | Cheng | | |
| 2016/0267188 A1 | 9/2016 | Spaulding et al. | | |
| 2017/0228696 A1 | 8/2017 | Brdiczka et al. | | |
| 2017/0371965 A1 | 12/2017 | Davar et al. | | |
| 2018/0046717 A1 | 2/2018 | Hong | | |
| 2018/0150571 A1* | 5/2018 | Douglas | ................. | H04L 51/52 |
| 2020/0302820 A1* | 9/2020 | Sherman | .................. | G09B 7/02 |

OTHER PUBLICATIONS

Goldberg, word2vec Explained, 2014.
Mikolov, Linguistic Regularities in Continuous Space Word Representations, 2013.
Mikolov, Efficient Estimation of Word Representations in Vector Space, 2013.
Rong, word2vec Parameter Learning Explained, 2016.

* cited by examiner

| SEARCH TERM | ENGAGED SUBJECT |
|---|---|
| "MEDIEVAL HISTORY" | HISTORY |
| "MIDDLE SCHOOL MATH" | ALGEBRA |
| "MEDIEVAL HISTORY" | ENGLISH |
| "FRESHMAN SCIENCE HELP" | CHEMISTRY |
| "COLLEGE SCIENCE" | PHYSICS |
| "MACHINE LEARNING PYTHON" | COMPUTER PROGRAMMING |
| "MACHINE LEARNING PYTHON" | PYTHON |

SPECIALIZED SEARCH SYSTEM AND METHOD FOR MATCHING A STUDENT TO A TUTOR

CROSS REFERENCE TO RELATED APPLICATIONS

This application is a continuation of pending U.S. patent application Ser. No. 16/035,040, filed Jul. 13, 2018, the entire disclosure of which is hereby incorporated herein by reference.

FIELD OF THE DISCLOSURE

The present disclosure generally relates to a system and method for matching a student to a tutor, and more particularly still relates to a specialized search system and method adapted to match a student to a tutor best suited to teach that student. More particularly still, the present disclosure relates to an improved system and method for converting a search query to one or more primary search subjects and for ranking one or more tutors skilled at teaching a subject in a listing of search results so that the tutor most appropriate to teach a student is ranked higher than other tutors that are not as skilled at teaching the subject.

DESCRIPTION OF BACKGROUND

The purpose of a search engine is to parse a search string and return a list of results that are pertinent to the user's search, with the most relevant results appearing towards the top of the user's search and less pertinent results appearing afterwards. There are numerous types of search engines ranging from general engines, such as Google, to highly specialized search engines such as those that are adapted to identify specific numerical information or even search engines that are adapted to catalog chemical research.

With regards to a search engine adapted to match a student to a tutor, the purpose of such an engine is to accept a search string from a prospective student and produce a ranked list of tutors that are suitable to meet the needs embodied within the search string. For example, if a user types in a search string such as "7th grade science," tutors that have skills in subjects such as "science," "physics," and "biology" would be returned.

However, prior art tutor search systems have suffered from a number of short comings. First, prior art tutor search engines are largely dependent on the profiles presented by tutors, which are susceptible to being manipulated to match common search terms. Second, prior art tutor search engines largely rely on the division of tutors into subjects. For specialized subject areas, the granularity of existing subjects is likely not sufficient. In addition, specialized search terms are not amenable to division into common subjects.
Objects of the Disclosed System, Method, and Apparatus Accordingly, it is an object of this disclosure to provide an improved search engine for use in matching a student to a tutor.

Another object of the disclosure is to provide a search engine that utilizes a table that relates historical search terms and the subject that students actually took lessons in to relate a particular search term to the subject most pertinent to a submitted search term.

Another object of the disclosure is to provide a search engine that produces a sorted list of tutors in response to a specific search term by a user.

Another object of the disclosure is to provide a search engine that inspects tutor profiles for specific terms that are related to other terms in the tutor's profile to potentially rank a tutor higher in a sorted list of tutors.

Other advantages of this disclosure will be clear to a person of ordinary skill in the art. It should be understood, however, that a system or method could practice the disclosure while not achieving all of the enumerated advantages, and that the protected disclosure is defined by the claims.

SUMMARY OF THE DISCLOSURE

Generally speaking, pursuant to the various embodiments, a computer-implemented method performed by at least one processor is disclosed. The method comprises the step of receiving a search query from a user. The query can be, for example, a search term, such as "middle school math," or something more complicated such as "machine learning using python." The method further comprises the step of retrieving a plurality of tutors that are responsive to the search query. For example, the tutors can be retrieved by identifying a subject or subjects that are pertinent to the search query and retrieving all tutors that are classified as being skilled in that subject. The method further comprises the step of computing a relevance score for each of the tutors. The relevance score can be computed by, for example, comparing the search query to a tutor's profile, and by adjusting the score based on the presence of various related terms within the tutor's profile. The method also comprises the step of presenting the tutors to the user. The presentation can be, for example, graphically via a web page or a computer application, or audibly by a smart speaker.

BRIEF DESCRIPTION OF THE DRAWINGS

Although the characteristic features of this disclosure will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

A person of ordinary skills in the art will appreciate that elements of the figures above are illustrated for simplicity and clarity and are not necessarily drawn to scale. The dimensions of some elements in the figures may have been exaggerated relative to other elements to help understanding of the present teachings. Furthermore, a particular order in which certain elements, parts, components, modules, steps, actions, events and/or processes are described or illustrated may not be actually required. A person of ordinary skill in the art will appreciate that, for the purpose of simplicity and clarity of illustration, some commonly known and well-understood elements that are useful and/or necessary in a commercially feasible embodiment may not be depicted in order to provide a clear view of various embodiments in accordance with the present teachings.

DETAILED DESCRIPTION

This specification generally describes technologies related to matching students to tutors. The disclosed technology specifically relates to a specialized search system and method that ranks tutors based on specific search queries. Specifically, a ranked listing of tutors is presented to the user based on a search term. As discussed below, the listing of tutors can be presented visually, using for example, a web browser or a computer application (with computer being defined broadly as set forth herein), or audibly via a smart speaker. The returned tutors are preferably arranged in an order based on the relevance to the original query from the user. In particular, a value related to the original search query from the user can be assigned to each tutor and the list of tutors can be sorted based on that value. Generally, the tutor with the highest relevance value would be presented first, followed by the tutor with next highest relevance value, etc. However, to prevent a particular tutor from being deluged with student requests, a number of highest rated tutors can be shuffled, which will prevent any particular tutor from ever being consistently shown first.

As described herein, a number of factors can be used to determine the relevance value, including the specific information within a tutor's profile, a database of prior searches and the subject that a student ended up taking lessons in, and other information regarding specific tutors, such as user reviews, the time that a tutor takes to respond to an inquiry from a student, and the track record of a particular tutor to convert a prospective student to an actual student.

Figure 1:
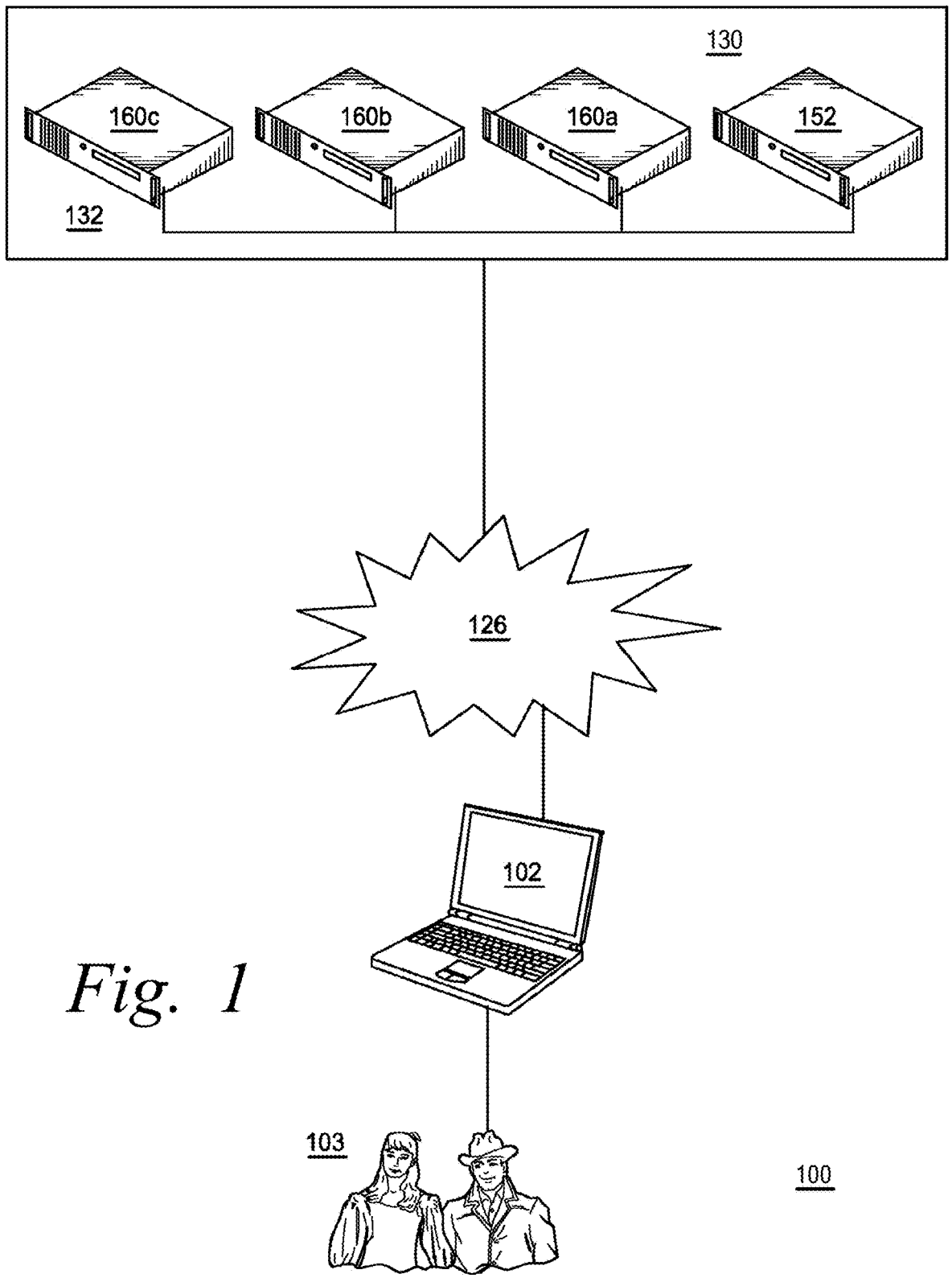
FIG. 1 is a simplified block diagram of a system for matching students to tutors as disclosed herein.

Turning to the Figures, and to FIG. 1 in particular, a block diagram illustrating an architecture for implementing a system to match a student to a tutor is depicted. The system 100 includes a computer 102 that may be used by a user 103 interacting directly with the computer 102 through a display screen and various input devices, including, for example, a touch screen, a keyboard and mouse, etc. It should be noted that the term computer 102 used herein is used broadly, and can refer to any kind of client computer, including a desktop, laptop, smartphone, tablet, etc. In addition, while the computer 102 is described as having a display screen, that is not a necessary feature of the disclosed system and method, which can be implemented using, for example, a computer without a screen, such as a smart speaker. Computer 102 can include a web browser, or an application specific interface allowing it to utilize the disclosed system and method.

As illustrated in FIG. 1, a front-end server 152 is coupled to the Computer 102 through a network 126. It should be noted that that the front-end server 152 and all other servers mentioned herein can be implemented as a collection of cloud servers, or as an actual, specific server. In addition, any of the servers referred to herein can be implemented as a virtual server. The front-end server 152 receives requests from computer 102 or other client devices. In some cases, a search can be carried out by a front-end server 152, but typically, a search is executed on one of the back-end servers 160*a*, 160*b*, 160*c*. Typically, a request is received by a front-end server 152, and passed to a back-end server 160*a*-*c* which will assemble a set of ranked search results, which are then passed back to the requesting computer 102 by a front-end server 152 or a different server.

Each of the servers 152, 160*a*, 160*b*, 160*c* can include an electronic computing device operable to receive, transmit, process, store, or manage data and information associated with the search system 130. The servers can each include one or more processors capable of executing programs, performing data manipulations and controlling tasks on the server. The servers will also generally include memory, such as dynamic random-access memory (DRAM), and storage, such as rotating magnetic disc storage, solid state disc storage, or some other type of storage. The servers will generally also include a network interface, such as, for example, an ethernet port, an 802.11 interface, etc.

The network 126 can be the Internet, a local area network (LAN), a wide area network (WAN), or any other network or combination thereof. Similarly, a network of any type 132 couples the servers 152, 160*a*, 160*b*, 160*c* to one another.

Typically, one or more servers 152, 160*a*, 160*b*, 160*c* contain logic for implementing the search functionality disclosed herein. For example, server 160*a* can include a search module configured to receive a search query from a computer 102 and generate a set of ranked search results responsive to the search query. The server 160*a* can generate a list of responsive search results for presentation to a user or forward the search results to another server within the search system 130. While the search module is described as being implemented on a single server 160*a*, it can also be distributed across multiple servers within the search system 130.

The memory of one of the servers 160*b* in the search engine system 130 can store data associated with the search system 130, such as, for example, final search results, or various intermediate search results as further discussed herein.

In the disclosed tutor match system, tutors are primarily sorted based on subject. Subjects can include, for example, 1) algebra, 2) history, 3) English, 4) computer programming, 5) chemistry, 6) physics, and 7) geometry. An actual listing of the subjects into which the disclosed tutor matching system "sorts" tutors into would be far greater in practice, and could include additional subjects, more specific subjects, and/or entirely different subjects.

Figures 2, 3:
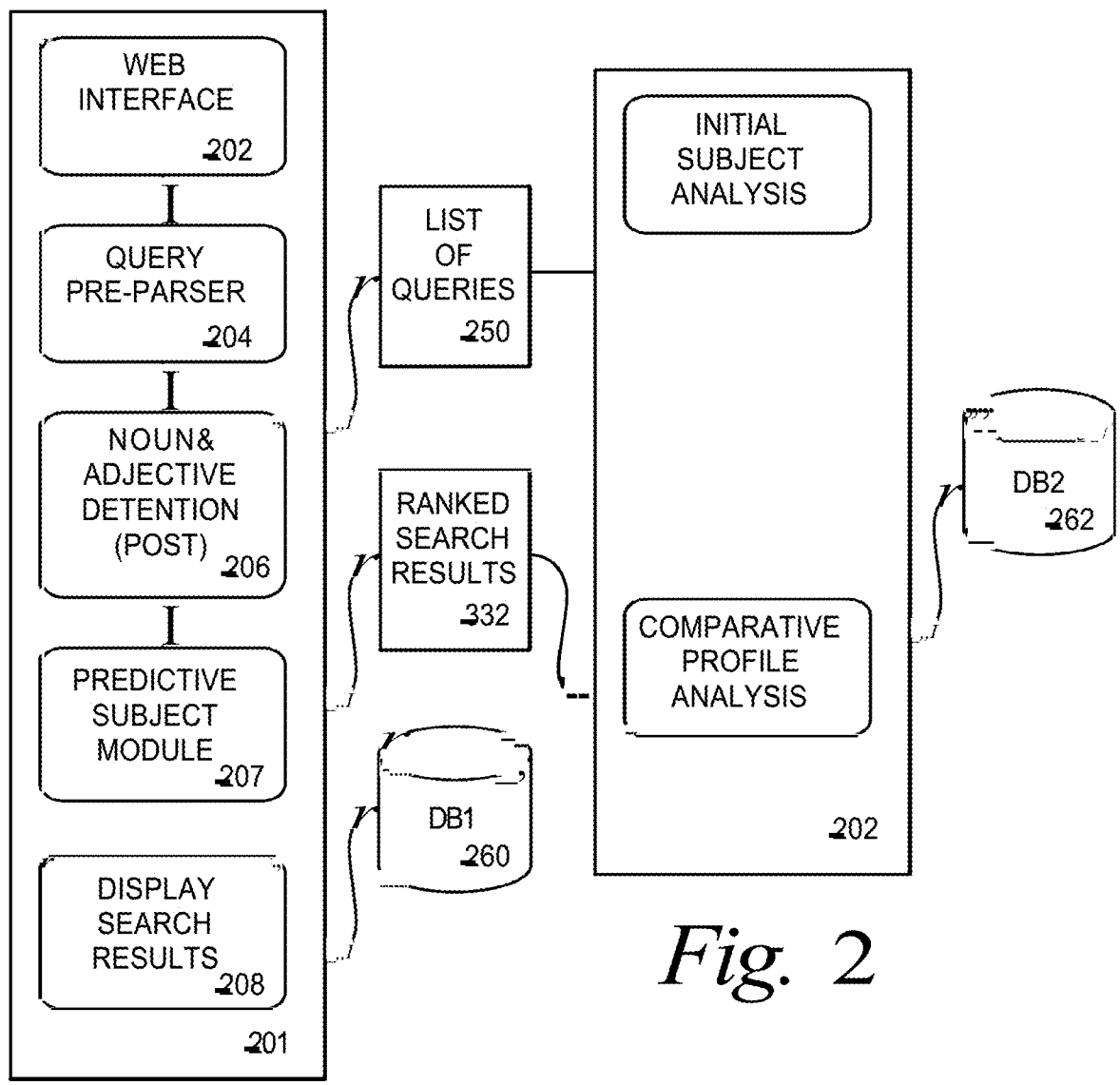
FIG. 2 is a software block diagram illustrating a system for matching students to tutors as disclosed herein.
FIG. 3 is a table from a database of historical search terms and the most relevant subject.

Turning to FIG. 2, a software block diagram illustrating the various components of the disclosed tutor matching system is illustrated. It should be noted that while certain components are ascribed to certain servers; i.e., front-end or back-end, any of the software components can function on any of the servers.

The software modules are generally split into two portions; front-end software 201 that will typically operate on a front-end server 152 and back-end software 211 that will typically operate on a back-end server 160*a*, 160*b*, or 160*c*. The front-end software 201 includes a user interface component 202. The user interface component 202 will provide an interface, such as a web based graphical user interface, to a web browser operated by a user 103. However, as explained previously, other types of interfaces can be used, such as an auditory interface adapted to work with a smart speaker, or a hybrid interface adapted to work with an intelligent wearable device. The user interface 202 will gather various information about the prospective student. Such information will include a search string. Examples of search strings include a) "middle school math help," b) "math and Spanish," and c) "medieval history."

The front-end software 201 also includes a Query pre-Parser component 204 ("pre-Parser 204"). The search string gathered by the user interface 202 is passed to the pre-Parser 204. The pre-Parser 204 will, among other functions, strip any "stop words" from the query before conducting additional analysis. Stop words include conjunctions and other common words, such as "and," "the," "or," etc. In addition, the query is split into different "sub-queries." For example, if a query of "middle school math and English" was made, the result would be at least two different sub-queries; i.e., 1) "middle school math," and 2) "English." The list sub-queries are passed onto a Noun & Adjective Detection module ("NADM") 206.

The front-end software 201 also includes a Noun & Adjective Detection module ("NADM") 206. The sub-queries produced by the pre-Parser 204 are passed onto the NADM 206. The NADM 206 is a specialized part-of-speech tagging (sometimes abbreviated as "POST") module. A typical POST module will, based on word context with a search string, identify whether a particular word is a noun, verb, adjective, adverb, pronoun, preposition, conjunction, determiner, exclamation, etc. Generally, a POST module will utilize a corpus of words along with a collection of rules to identify the part of speech of a particular portion of an input string. The NADM 206 is a specially trained POST module that recognizes subjects and related keywords that are pertinent to the student-tutor relationship. A simplified database table that illustrates how subjects may be related to pertinent keywords is shown in FIG. 3. In particular, the table relates a search term to a particular subject that a student actually received lessons in. It should be noted that a particular search term can occur more than once in the table, with either the same or a different resultant subject.

The NADM 206 generates from the sub-queries a list of query primitives 250 that are passed to the back-end software modules 211. For a query of "middle school math and English," for which the sub-queries are 1) "middle school math" and 2) "English," as described above, the list of query primitives could likewise be 1) "middle school math," and 2) "English;" i.e., the sub-queries are unchanged by the NADM 206 in generating the list of query primitives 250. On the other hand, for a sub-query of "best algebra tutor," the only query primitive would be "algebra tutor," as the NADM would eliminate the word "best" as a pure adjective that adds nothing to the query.

Figure 4:
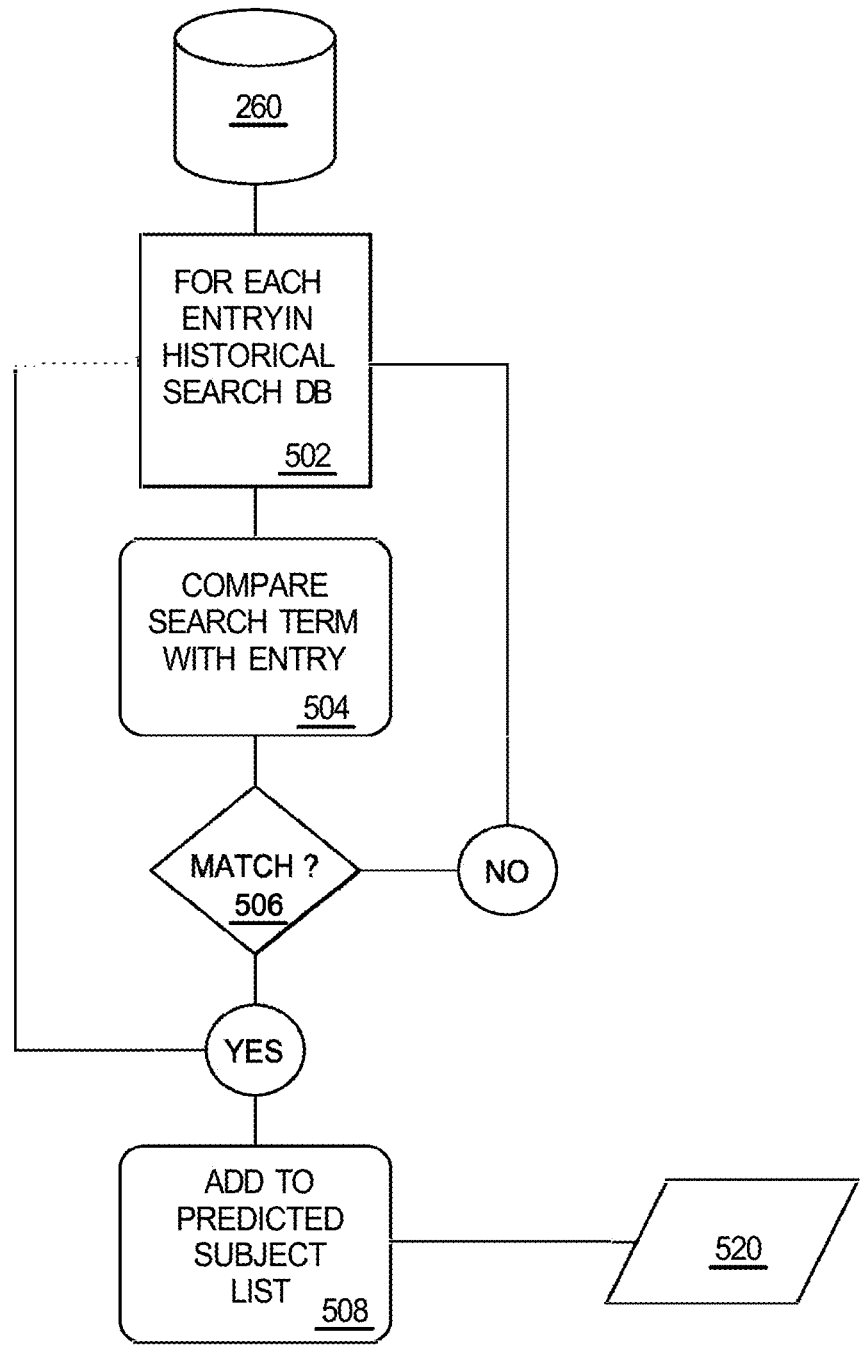
FIG. 4 is a flowchart illustrating the operation of a predictive subject module.

The front-end software 201 also includes a Predictive Subject Module 207. The Predictive Subject Module ("PSM") 216 relies on the table of historical search terms and subjects 260 to predict a subject that a student will seek lessons in based on the results of past search terms. A simplified software block diagram illustrating the operation of the PSM is shown in FIG. 4. In step 502, each term in the historical search table 260 is iterated through. In step 504, a comparison is made between a search term as relayed by the ISAM 212 and an entry in the historical search table 260. A check is made to determine if the search term component of the entry is identical to the search term in step 506. If so, then the corresponding subject is added to a predicted subject list 520 in step 508. If not, then the next entry is retrieved in step 502. Once complete, the predicted subject list is added to the list of search terms that are passed to the back-end software 211.

The PSM effectively provides a short cut to the most likely subjects that a student is seeking instruction in by matching the student to the subjects that previous students that submitted the same search string actually received tutoring in. This is especially advantageous for topics where specific subjects are not present in the search system.

The back-end software 211 includes an Initial Subject Analysis Module 212. The ISAM 212 accepts the query primitives from the front-end software 201, and, based on these primitives, queries a second table 262 comprising tutor profiles to return a first ranked list of tutor profiles. A tutor profile includes any subjects that the tutor is sorted into, as well as a textual description that is manually input by the tutor.

Figure 5:
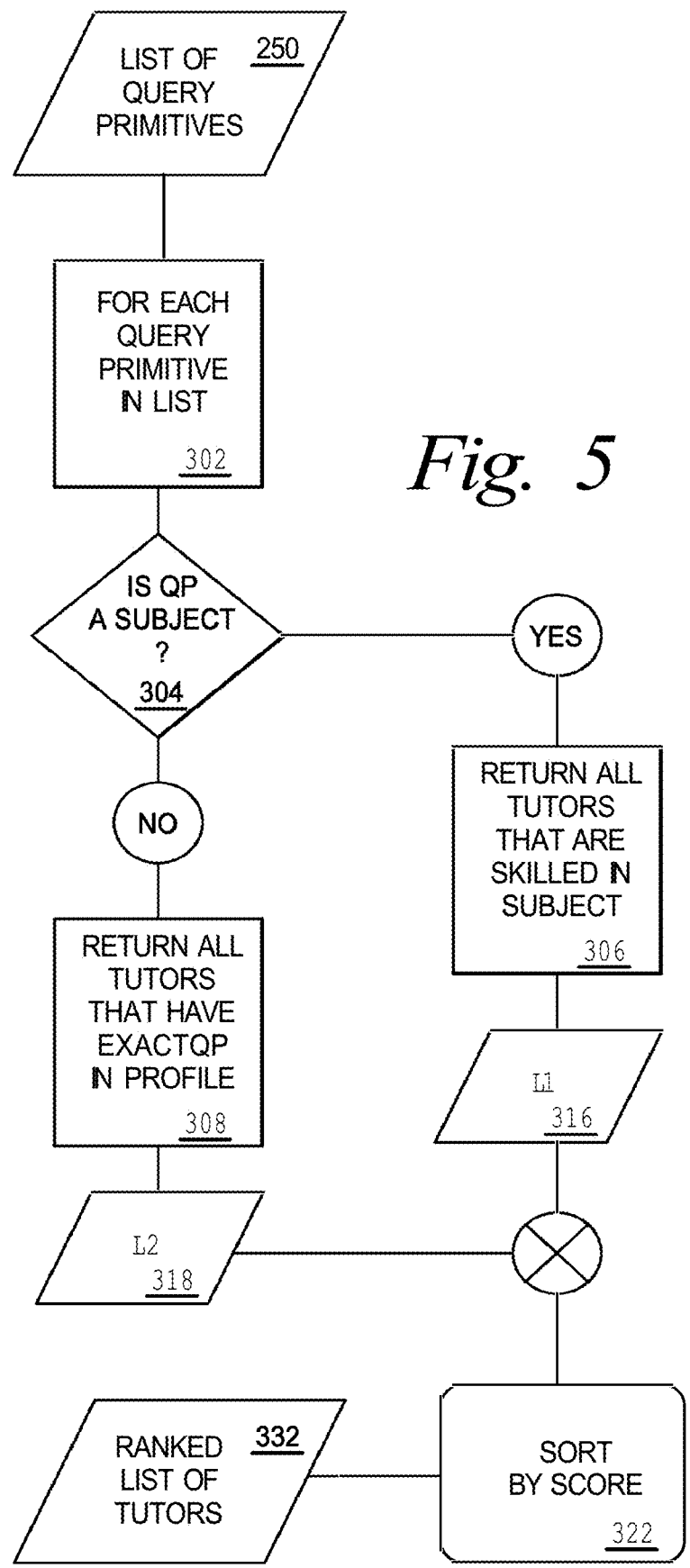
FIG. 5 is a flowchart illustrating the operation of a software module to produce a ranked list of tutors based on a search term.

Turning to FIG. 5, a flowchart illustrating the operation of the ISAM at a high-level is depicted. A list of query primitives 250 is provided by the front-end software 201. For every query primitive in the list 250, in step 304 a check is made to determine if the query primitive is a subject as recognized by the system. If so, execution transitions to step 306, where all tutors in the tutor profile database 262 are returned and compiled into a first list 316 and assigned a relevance score. As all tutors in this list are inserted only because they match a given subject, they are all given the same relevance score; as an example, each tutor in the first list 316 may be assigned a relevance score of 10.

Returning to decision 304, if the query primitive is not a subject, execution transitions to step 308, where a search through the tutor profile database 262 is executed, and any tutors that have the exact search string in their profile description are returned as a second list 318 as well as assigned a relevance score. The relevance score assigned to profiles that contain the exact text in the profile is higher than those that merely match a subject. Accordingly, the relevance score assigned to a profile that contains an exact search term once might be 20. However, if the search term appears more than once, the relevance score can be adjusted using a well-known algorithm such as Term Frequency/Inverse Document Frequency. Accordingly, a profile that mentions the exact search term twice can be assigned a relevance score of 39, while a profile that mentions the exact search term fifty times; i.e., a clear example of key word stuffing, might be ranked lower at, for example, a relevance score of 5.

In step 320, either the first list 316 or the second list 318 is appended to any previous list, after which the next query primitive is processed. If no additional primitives need to be processed, then execution transitions to step 322, where the assembled list is sorted by relevance score, resulting in a ranked list of tutors 332. The back-end software 211 also includes a Comparative Subject Analysis Module ("CSAM") 214. The purpose of the CSAM is to rank certain profiles higher than others based on the presence of certain terms within a tutor's profile. In particular, the database of tutor profiles is scanned using the algorithm of FIG. 6 to determine words that are related to other terms, and, where the tutor's profile is determined to include a high number of related words, that profile is given a higher relevance score as outlined further below.

Figure 6:
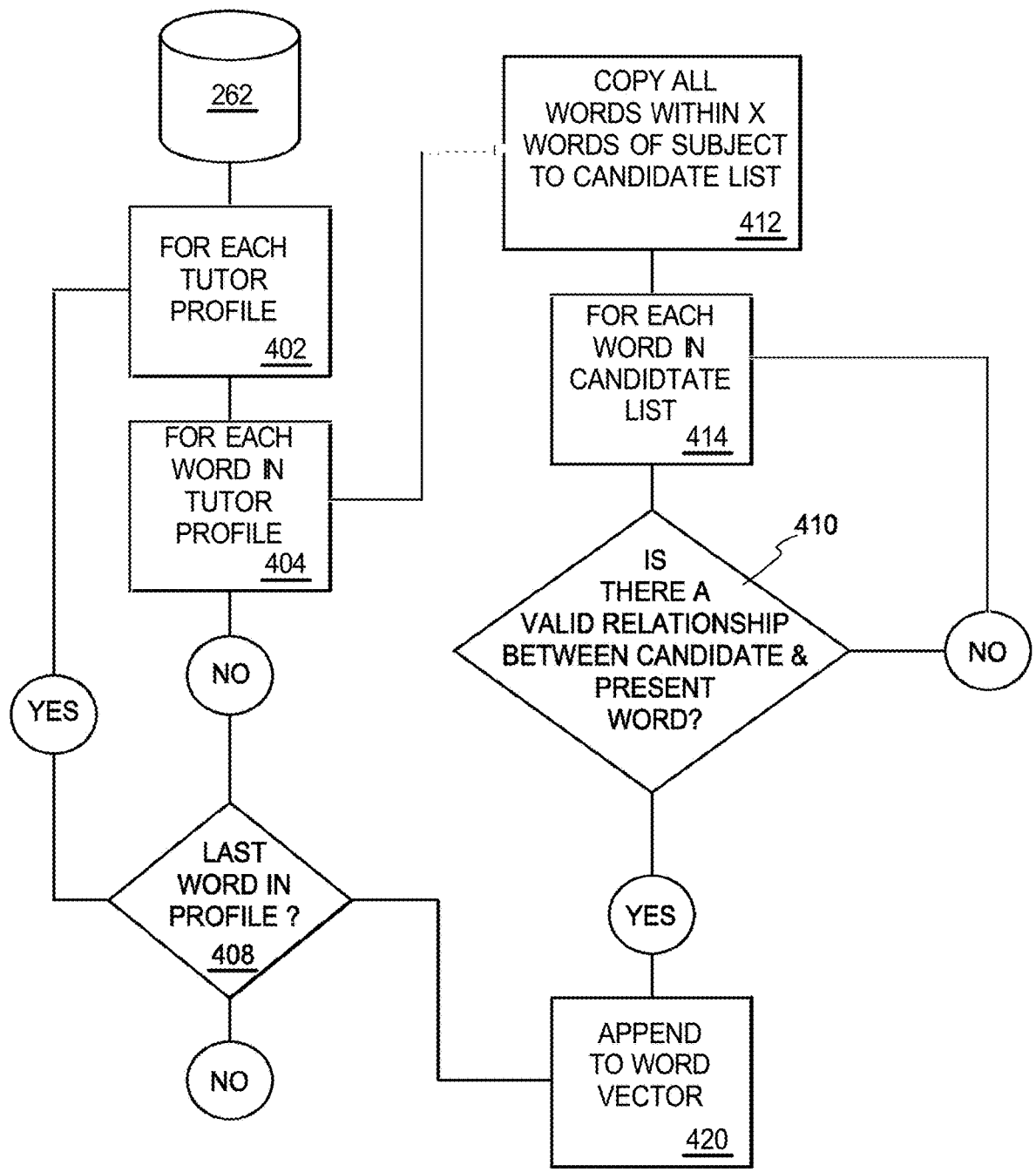
FIG. 6 is a flowchart illustrating the construction of a word vector for terms within the collection of tutor profiles.

Turning to FIG. 6, an algorithm for the construction of a word vector for the purpose of determining words with a valid relationship to words within the tutor profile is depicted. In particular, the table of tutor profiles 262 is examined, and, in particular, each tutor profile is iterated through in step 402. Once a tutor profile is retrieved, each word in the tutor profile is iterated through in step 404. In step 412, all words within X words, both forward and back, of the identified subject word are copied to a candidate list. X can be any value, such as, for example, 3 words, 5 words, 7 words, 10 words, or 100 words. Every word in the candidate list is iterated through in step 414, and for a given word, an examination is conducted in step 416 to determine if a valid relationship might exist between the word under examination and the present word in the candidate list. The determination of a valid relationship in step 416 can be made using many algorithms as known in the art, including, for example, Latent Semantic Analysis ("LSA") and Latent Dirichlet Allocation ("LDA"), as well as Feedforward Neural Net Language Model ("NNLM"), Recurrent Neural Net Language Model ("RNNLM"), a Continuous "Bag-of-Words" Model ("CBOW), and a Continuous Skip-gram Model. If a valid relationship does not exist, execution transitions to step 421, whose operation is described below. On the other hand, if a valid relationship does exist, then execution transitions from step 416 to step 420, where the additional word is appended to a word vector 425. Execution then transitions to step 421, where a check is made to determine if the present word is the last word in the candidate list. If so, then a check is made to determine if there are any other additional words in the profile in step 408. If there are additional words in the profile, execution transitions to step 404, where the next word in the tutor profile is retrieved. Otherwise, execution transitions to step 402, where the next tutor profile is retrieved.

Returning to the operation of the CSAM 214 in FIG. 2, the word vectors constructed using the algorithm of FIG. 5 is used to determine if a profile should be assigned a higher relevance score. If the profile under examination does contain any of the related words in the word vector then the tutor's profile is boosted in the form of being given a higher relevance score, which will raise its position within the ranked list of tutors; for example, the presence of two related words within a profile may raise a tutor's rank from 38th place within the ranked list of tutors to 4th place.

The specific operation of how related words can impact a particular relevance score assigned to a tutor profile is explained below by reference to an example. If a student searches for "Algebra," the following terms can be identified as related words, and assigned a "boost score.":

A) "Geometry" Boost Score 0.943
B) "Trigonometry" Boost Score 0.909
C) "Pre-calculus" Boost Score 0.879
D) "Calculus" Boost Score 0.871
E) "Pre-algebra" Boost Score 0.852

For each related word that is contained within the tutor profile, the relevance score assigned to the tutor profile is boosted. One way to accomplish this boost would be multiply the assigned relevance score by 1 plus the Boost Score for a particular related word. For example, if the originally calculated relevance score for a tutor's profile is 56, and the term "geometry" is present within the tutor's profile, it would be boosted to 56+(1×0.943)=56.943.

In addition, in certain embodiments, the location of the related word within the tutor's profile can affect the boost score. For example, if a related word appears in the title of the profile, the boost score can be slightly increased by, for example, 10%. In addition, if the related word appears in multiple places in the profile, such as in the title and body of the profile, the tutor's profile would be given an even larger boost.

Obviously, many additional modifications and variations of the present disclosure are possible in light of the above teachings. Thus, it is to be understood that, within the scope of the appended claims, the disclosure may be practiced otherwise than is specifically described above.

The foregoing description of the disclosure has been presented for purposes of illustration and description and is not intended to be exhaustive or to limit the disclosure to the precise form disclosed. The description was selected to best explain the principles of the present teachings and practical application of these principles to enable others skilled in the art to best utilize the disclosure in various embodiments and various modifications as are suited to the particular use contemplated. It should be recognized that the words "a" or "an" are intended to include both the singular and the plural. Conversely, any reference to plural elements shall, where appropriate, include the singular.

It is intended that the scope of the disclosure not be limited by the specification but be defined by the claims set forth below. In addition, although narrow claims may be presented below, it should be recognized that the scope of this invention is much broader than presented by the claim(s). It is intended that broader claims will be submitted in one or more applications that claim the benefit of priority from this application. Insofar as the description above and the accompanying drawings disclose additional subject matter that is not within the scope of the claim or claims below, the additional inventions are not dedicated to the public and the right to file one or more applications to claim such additional inventions is reserved.

What is claimed is:

1. A computer-implemented method performed by at least one processor comprising the steps of:
receiving a search query from a user;
parsing the search query to produce one or more query primitives, wherein parsing the search query includes removing any stop words from the search query;
accessing a database including a table of tutor profiles, each tutor profile in the table of tutor profiles corresponding to a specific tutor, and the database including additional tutor information regarding the specific tutors, the additional tutor information including a track record of a specific tutor to convert a prospective student to an actual student;
obtaining a plurality of tutor profiles from the database that are responsive to the search query;
extracting from each of the tutor profiles at least one subject and one or more related words wherein said one or more related words are related to the at least one subject;
computing a relevance score for each of the tutor profiles using the at least one subject, the one or more related words, the one or more query primitives, and the track record of the specific tutor to convert a prospective student to an actual student;
wherein the step of computing comprises determining the equivalence of the one or more query primitives with the at least one subject and the one or more related words, and assigning a relevance score to a tutor profile based on how alike the at least one subject and the one or more related words are to the one or more query primitives and based on the track record of the specific tutor to convert a prospective student to an actual student; and
presenting the tutor profiles to a user so that tutor profiles with the highest relevance scores are presented to the user first.

2. The method of claim 1, further comprising a step of accessing a historical search database including a historical search table relating historical search terms to subjects that students actually received lessons in; and wherein the step of extracting comprises querying the historical search table, comparing the one or more query primitives to the historical search terms, and when a hit occurs, adding a subject that students actually received lessons in to the one or more query primitives.

3. The method of claim 1, wherein the step of generating the list of query primitives comprises identifying a part of speech of a particular word in a sub-query.

4. The method of claim 3, wherein, when the particular word is identified as a pure adjective, the step of generating the list of query primitives further comprises eliminating the pure adjective.

5. The method of claim 2, wherein the table relating historical search terms to subjects includes more than one occurrence of a particular search term.

6. The method of claim 5, wherein the particular search term occurs at least once with a first resultant subject and at least once with a second resultant subject different from the first resultant subject.

7. The method of claim 5, wherein the particular search term occurs more than once with the same resultant subject.

8. The method of claim 1, wherein the stop words include conjunctions.

9. A computer-implemented method performed by at least one processor comprising the steps of:
 receiving a search query from a user;
 parsing the search query to produce one or more query primitives, wherein parsing the search query includes removing any stop words from the search query;
 accessing a database including a table of tutor profiles;
 obtaining a plurality of tutor profiles from the database that are responsive to the search query;
 extracting from each of the tutor profiles at least one subject and one or more related words wherein said one or more related words are related to the at least one subject and further wherein the one or more related words are related to the at least one subject using historical search terms;
 computing a relevance score for each of the tutor profiles using the at least one subject, the one or more related words, and the one or more query primitives;
 wherein the step of computing comprises determining an equivalence of the one or more query primitives with the at least one subject and the one or more related words, and assigning a higher relevance score to a tutor profiles when the at least one subject and the one or more related words of the tutor profile are more like the one or more query primitives than those of a different tutor profile are like the one or more query primitives; and
 presenting the tutor profiles to a user so that tutor profiles with the highest relevance scores are presented to the user first.

10. The method of claim 9 further comprising a step of accessing a historical search database including a historical search table relating historical search terms to subjects that students actually received lessons in; and wherein the step of extracting comprises querying the historical search table, comparing the one or more query primitives to the historical search terms, and when a hit occurs, adding a subject that students actually received lessons in to the one or more query primitives.

11. The method of claim 9, wherein the step of generating the list of query primitives comprises identifying a part of speech of a particular word in a sub-query.

12. The method of claim 11, wherein, when the particular word is identified as a pure adjective, the step of generating the list of query primitives further comprises eliminating the pure adjective.

* * * * *